(12) United States Patent
Gifford

(10) Patent No.: US 7,434,326 B2
(45) Date of Patent: Oct. 14, 2008

(54) PRECISION BOX JIG

(76) Inventor: Edward Gifford, 3325 Dempsey Rd., Manhattan, KS (US) 66502

( * ) Notice: Subject to any disclaimer, the term of this patent is extended or adjusted under 35 U.S.C. 154(b) by 18 days.

(21) Appl. No.: 11/420,328

(22) Filed: May 25, 2006

(65) Prior Publication Data

US 2006/0265893 A1 Nov. 30, 2006

Related U.S. Application Data

(60) Provisional application No. 60/684,472, filed on May 25, 2005.

(51) Int. Cl.
*G01D 21/00* (2006.01)
(52) U.S. Cl. .................. 33/528; 33/DIG. 10
(58) Field of Classification Search .......... 33/528, 33/DIG. 10, 613, 666, 485–486
See application file for complete search history.

(56) References Cited

U.S. PATENT DOCUMENTS

| | | | | |
|---|---|---|---|---|
| 2,990,172 A * | 6/1961 | Gianotta | ................ | 33/DIG. 10 |
| 3,954,717 A * | 5/1976 | Tarr | ................ | 33/DIG. 10 |
| 5,072,523 A | 12/1991 | Bennett | | |
| 5,111,593 A | 5/1992 | Gehen, Sr. | | |
| 5,361,509 A | 11/1994 | Wheeler, Sr. et al. | | |
| 5,615,490 A * | 4/1997 | Burchell | ................ | 33/528 |
| 5,860,219 A * | 1/1999 | Wilkinson | ................ | 33/528 |
| 5,921,522 A | 7/1999 | Weber | | |
| 6,098,939 A | 8/2000 | He | | |
| 6,188,022 B1 | 2/2001 | He | | |
| 6,209,836 B1 | 4/2001 | Swanson | | |
| 6,323,424 B1 | 11/2001 | He | | |
| 6,484,980 B2 | 11/2002 | Medlin, Sr. et al. | | |
| 6,590,155 B2 | 7/2003 | Vrame et al. | | |
| 6,765,146 B1 | 7/2004 | Gerardo | | |
| 7,373,730 B2 * | 5/2008 | Murphy | ................ | 33/528 |
| 2002/0184778 A1 * | 12/2002 | Yrazabal | ................ | 33/528 |

* cited by examiner

*Primary Examiner*—Yaritza Guadalupe-McCall
(74) *Attorney, Agent, or Firm*—Hovey Williams LLP

(57) ABSTRACT

Simplified, easy-to-use electrical utility box positioning jig assemblies (10, 54) are provided including an elongated, upright standard (16) having opposed, generally flat, front and rear surfaces, and a support (18, 56) positionable along the length of the standard (16) and operable to hold a utility box (12, 58) during attachment thereof to a structural member (44). In one embodiment, the support (18) is generally C-shaped and is designed to hold a utility box (12) commonly used in residential construction. Alternately, a C-shaped support (56) may be used having permanent magnets (80), in order to hold a metallic utility box (58) used in commercial construction. The standard (16) is designed for direct, face-to-face contact with a structural member (44), and is slotted to allow selective placement of the associated box holder (18, 56).

17 Claims, 6 Drawing Sheets

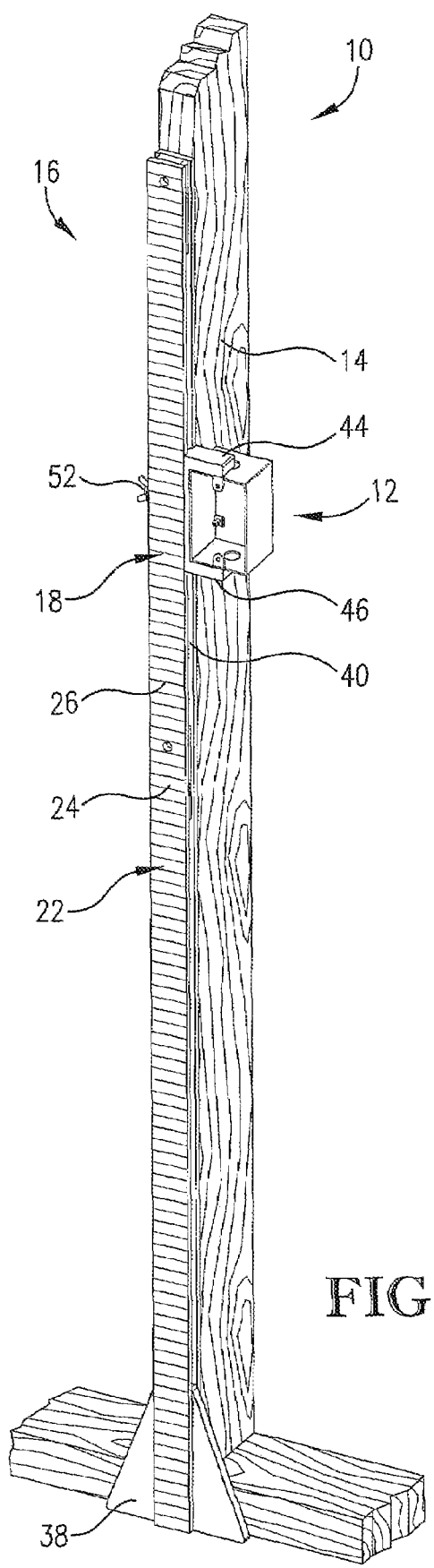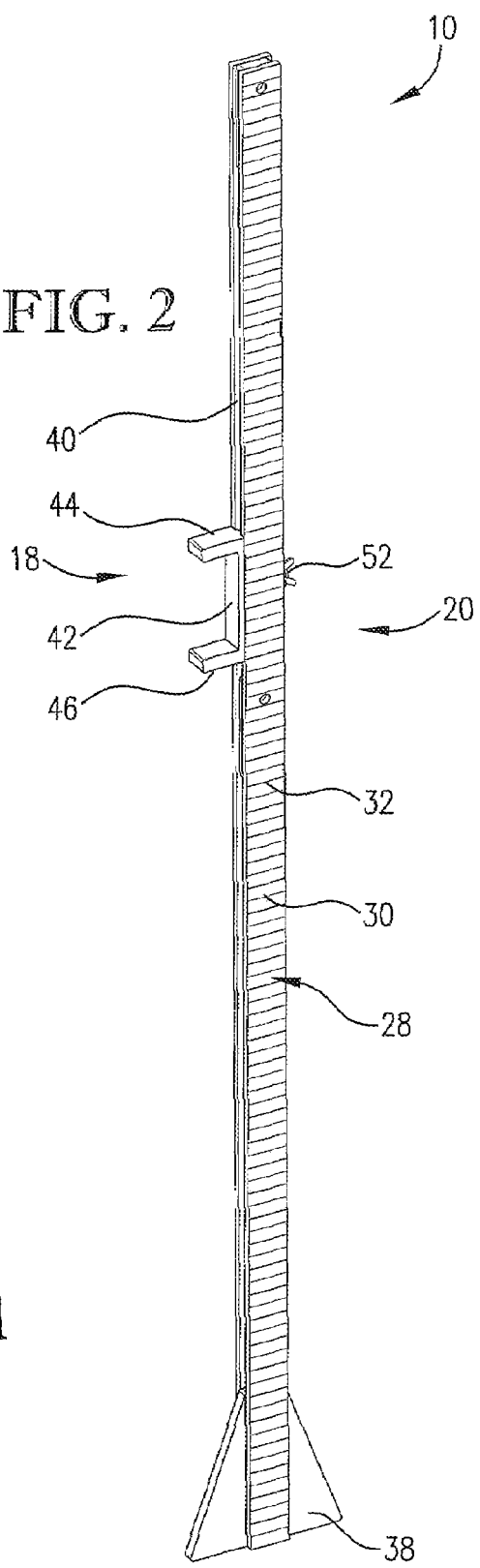

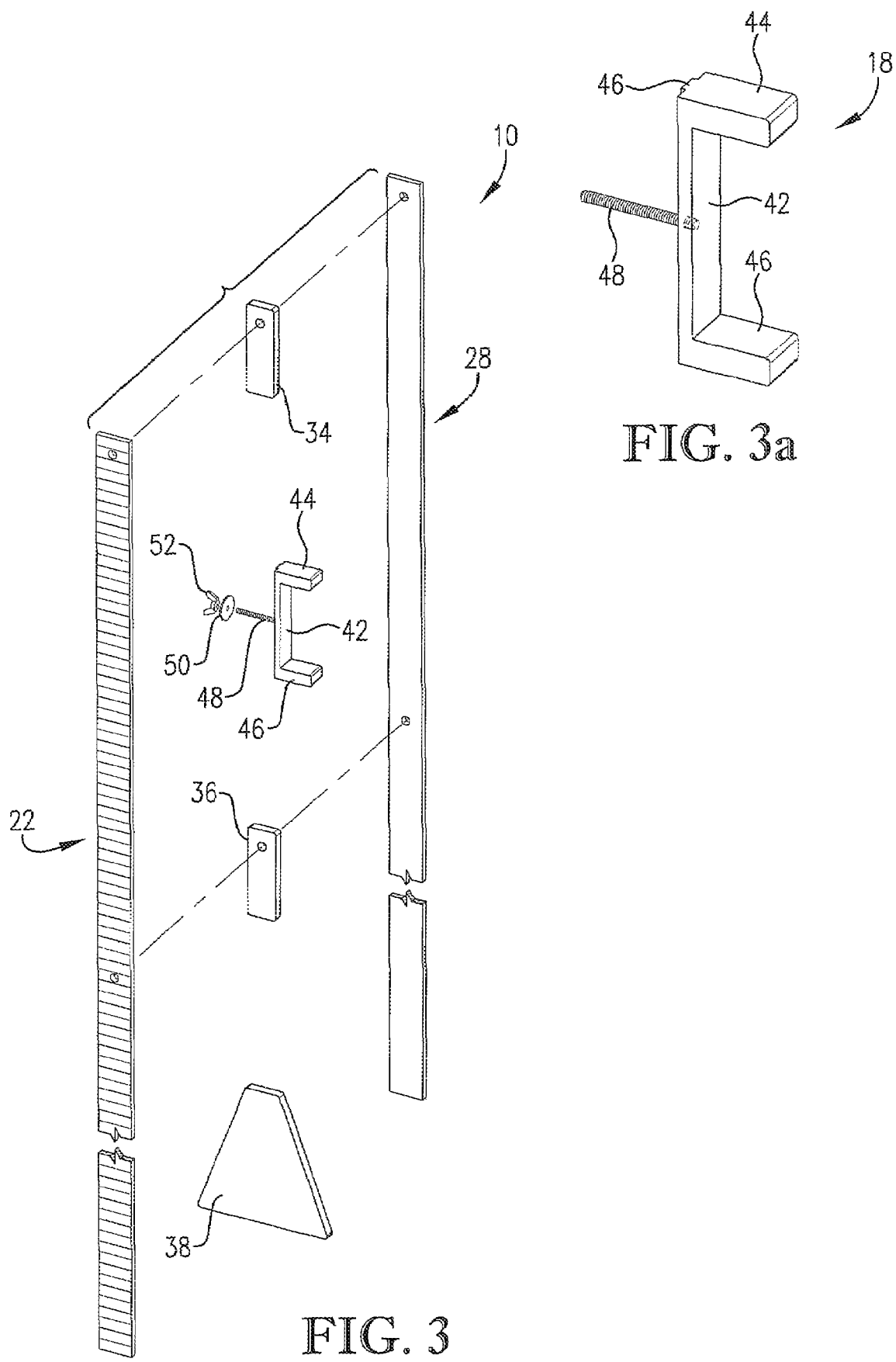

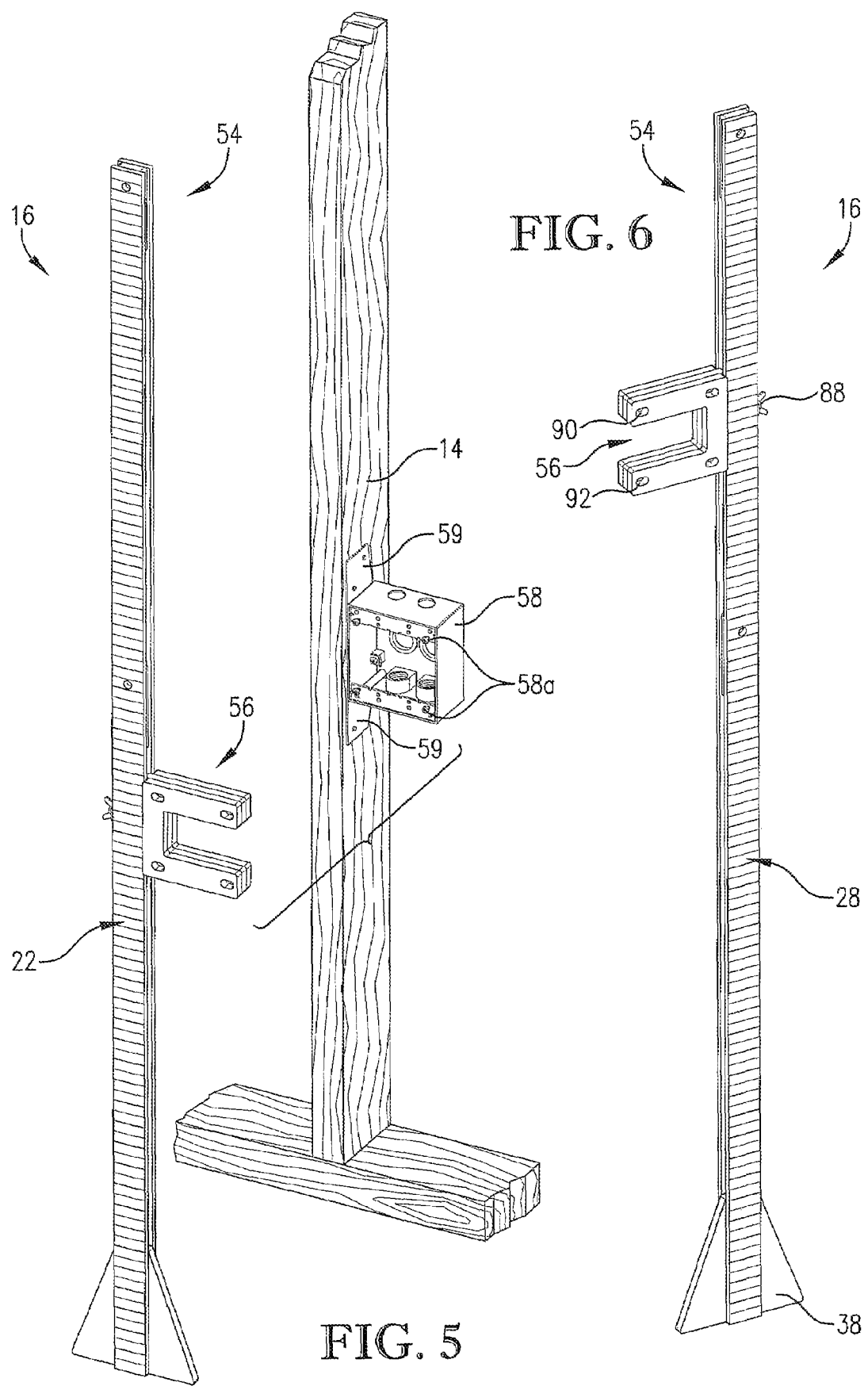

PRECISION BOX JIG

CROSS-REFERENCE TO RELATED APPLICATION

This application claims the benefit of U.S. Provisional Application Ser. No. 60/684,472 filed May 25, 2005. This prior application is incorporated by reference herein.

BACKGROUND OF THE INVENTION

1. Field of the Invention

The present invention is broadly concerned with precision jig assemblies especially designed for the accurate and repeatable positioning of electrical utility boxes on structural members (e.g., upright wooden or metal studs) during residential or commercial construction. More particularly, the invention is concerned with such jig assemblies of simplified design which can be used by both skilled and unskilled workmen to achieve proper utility box mounting throughout construction projects.

2. Description of the Prior Art

Devices have been proposed in the past to aid electricians in the placement of electrical utility boxes. However, these have been either unduly complex and difficult to use, or did not have a desirable degree of operational flexibility. For example, U.S. Pat. No. 5,361,509 describes an installation tool having a multiplicity of parts and consequent complexity of use. The tool of the '509 patent has a tubular support with a box-holding member together with separate height and depth adjustments and an alignment mechanism to ensure that an electrical box is properly located relative to a stud. Similarly, U.S. Pat No. 5,111,593 discloses an electrical utility box mounting device including a channel supporting a vertically shiftable, component which supports a utility box. This unit is relatively heavy and cumbersome and requires multiple positioning steps in use.

U.S. Pat. No. 5,921,522 describes yet another outlet box positioning assembly including an elongated support equipped with jaw and spacer bars for establishing the horizontal position of a utility box relative to a horizontal stringer. However, this device provides no height markings or other means of independently ascertaining a proper mounting height. U.S. Pat. No. 6,590,155 discloses a floor stand for mounting of an electrical utility box. However, this unit is not reusable and thus constitutes an added expense.

Other references of background interest includes U.S. Pat. Nos. 6,484,980 and 6,765,146.

SUMMARY OF THE INVENTION

The present invention overcomes the problems outlined above and provides a simplified electrical utility box positioning jig assembly broadly including an elongated standard presenting a pair of opposed, generally flat, front and rear surfaces, at least the front surface having a series of vertically spaced apart height measurement markings thereon. The assembly also includes a support configured to hold an electrical utility box, together with structure operatively coupling the support to the standard and permitting selective up and down movement of the support along the length of the standard and locking of the support at a selected height on the standard. Importantly, the rear surface of the standard is configured for direct, face-to-face contact with a structural member to which the box is to be attached when the box is held by the support.

In preferred forms, the standard includes spaced apart front and rear panels defining an elongated slot therebetween, the outer face of the front panel defining the front standard surface, and the outer face of the rear panel defining the rear standard surface. The front and rear standard surfaces are provided with vertically spaced apart height markings permitting precise positioning of the box-holding support. The spaced apart height markings may be integrally formed in the panel faces or may be in the form of a label that is permanently adhered thereto. Also, this design permits alternate use of the jig assembly for box mounting on either side of a structural upright member.

The box-holding support preferably has an elongated, threaded bolt which extends through the standard slot, and uses conventional fastening hardware to clamp the support in place against the standard. The support may be designed to receive a utility box and frictionally hold it in place, or alternately the support may have magnets serving to magnetically adhere a metallic box to the support.

During use of the positioning jigs of the invention, the box-holding support is first shifted to a selected position along the length of the standard, and is locked in place at such position. A utility box is then coupled with the support and the assembly is located adjacent a structural member with the rear surface of the standard in direct face-to-face contact with the structural member. The utility box is then attached to the structural member and the jig assembly is removed. This operation may be repeated as necessary, in order to properly position all of the utility boxes at substantially the same height throughout the construction site.

BRIEF DESCRIPTION OF THE DRAWINGS

FIG. 1 is an isometric view of the positioning jig assembly of the invention, shown during installation of an electrical utility box to a structural member;

FIG. 2 is an isometric view of the jig assembly depicted in FIG. 1, but showing the opposite face thereof;

FIG. 3 is a fragmentary, isometric exploded view of the jig assembly of FIGS. 1-2;

FIG. 3a is an enlarged isometric view of the C-shaped clamp forming a part of the jig assembly of FIGS. 1-3;

FIG. 5 is an isometric view illustrating use of another jig assembly in accordance with the invention, for installation of a metallic electrical utility box to a commercial construction structural member;

FIG. 6 is an isometric view of the jig assembly illustrated in FIG. 5, but showing the opposite face thereof;

DETAILED DESCRIPTION OF THE PREFERRED EMBODIMENT

Figure 4:
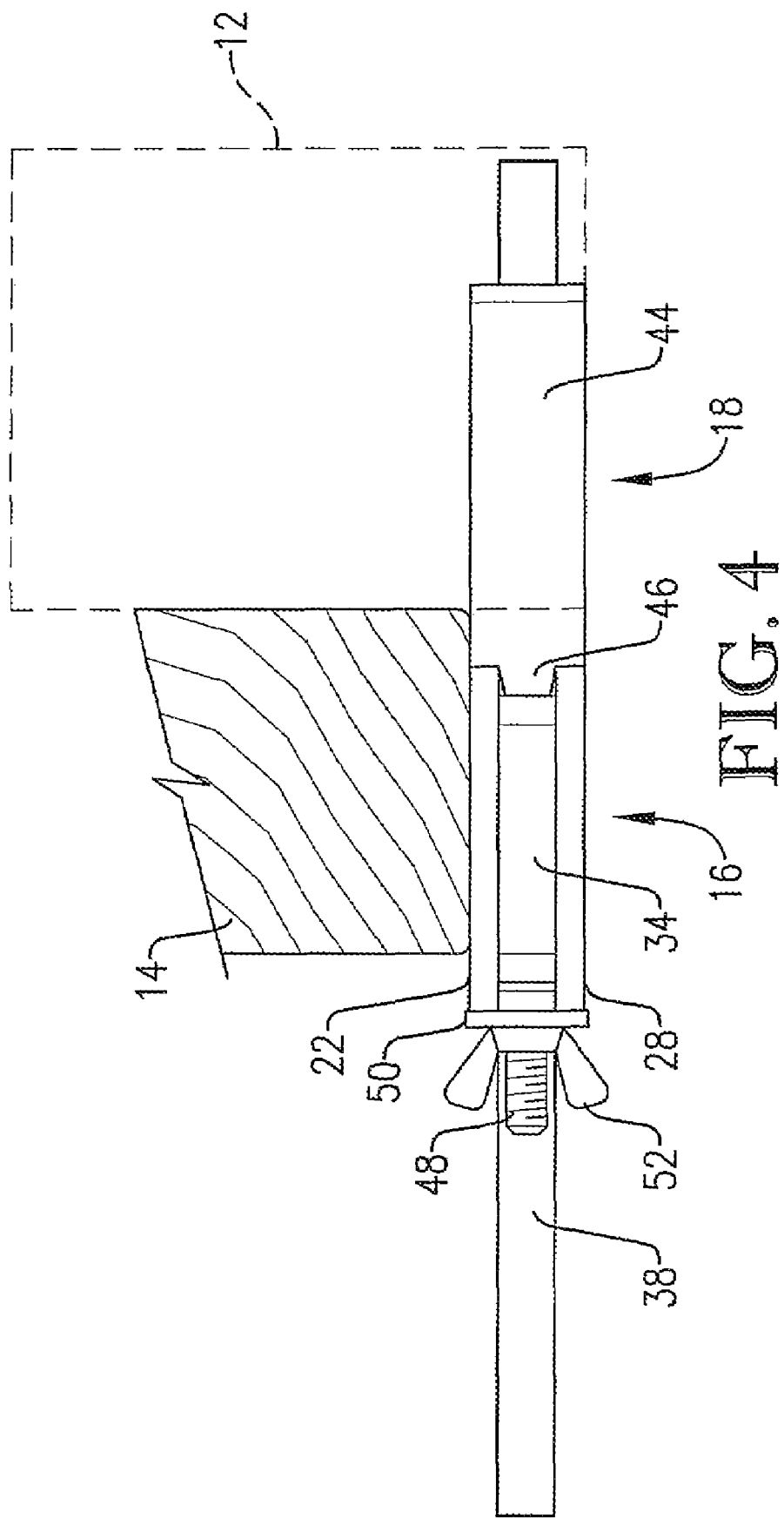
FIG. 4 is a plan view illustrating use of the jig assembly of FIGS. 1-3 in positioning of an electrical utility box adjacent a residential construction structural member.

Turning now to the drawings, and particularly FIGS. 1-4, a positioning jig assembly 10 is illustrated, which is especially designed for installation of electrical utility boxes 12 onto structural members such as upright studs 14 in an accurate, and repeatable fashion. Broadly speaking, the assembly 10 includes an upright standard 16, a generally C-shaped support 18 and coupling structure 20 for coupling the support 18 to standard 16.

In more detail, the standard 16 is made up of an elongated front panel 22 having a front surface 24 provided with a series of spaced apart (e.g., at ½-inch increments), horizontal height markings 26, and a substantially identical rear panel 28 presenting rear surface 30 also having spaced apart height markings 32. As best illustrated in FIG. 3, the front and rear panels 22 and 28 are separated by means of internal spacers 34 and 36, and by lowermost base 38, thereby forming an elongated slot 40 extending along the length of the standard. As shown, the base 38 is somewhat triangular in shape so as to present a relatively wide floor-contacting bottom surface. The components of standard 16 are adhesively secured together, with the spacers 34 and 36 and base 38 sandwiched between the front and rear panels 22, 28.

The support 18 (see FIG. 3a) includes an upright, central bight section 42 as well as upper and lower projecting arms 44, 46. The bight 42 has an elongated, substantially rectangular projection 46 sized to fit within slot 40, and the arms 44, 46 are spaced so as to receive and frictionally hold a utility box 12 (FIG. 1). The coupling structure 20 includes an elongated, threaded bolt 48 extending from bight 42 and of a length to extend fully through the slot 40. A washer 50 and wing nut 52 are secured to the outer end of bolt 48 and engage the opposite face of standard 16, as illustrated in FIGS. 1, 2, and 4. Preferably, the thickness of support 18 is substantially the same as the thickness of standard 16 so that the inner and outer surfaces of the support are essentially flush with the front and rear surfaces 24, 30 of the standard 16.

The use of assembly 10 is best illustrated in FIGS. 1 and 4. As a preliminary matter, the support 18 is located along the length of standard 16 by loosening lock nut 52 and vertically shifting the support 18 to a desired height position; this is facilitated by virtue of the height markings 26. Next, the assembly 10 is positioned adjacent a structural member, as illustrated in FIG. 1, with the rear surface 30 of rear panel 28 in direct, face-to-face contact with the facing edge of member 14. At this point, a box 12 is loaded into the support 18 with the forward open face of the box 12 substantially flush with the outer surface of the support 18. In this fashion, the outer face of the box 12 is located forwardly of the edge of member 14, which is desired in residential construction. The assembly 10 is then finally positioned in close adjacency to member 14, as best seen in FIG. 4. The box 12 is then permanently affixed to the member 14, by screws, nails, or any other convenient fastener. The assembly 10 can then be removed leaving the box 12 in place. In alternative procedures, the box 12 may be loaded onto support 18 prior to positioning of the assembly 10 adjacent member 14.

It will also be seen that the orientation of assembly 10 may be reversed, i.e, the front panel 22 may be placed adjacent the member 14, leaving the rear panel 28 exposed. This is convenient inasmuch as the assembly 10 may be used with equal facility to mount a utility box on either face of member 14.

Figures 7, 7A:
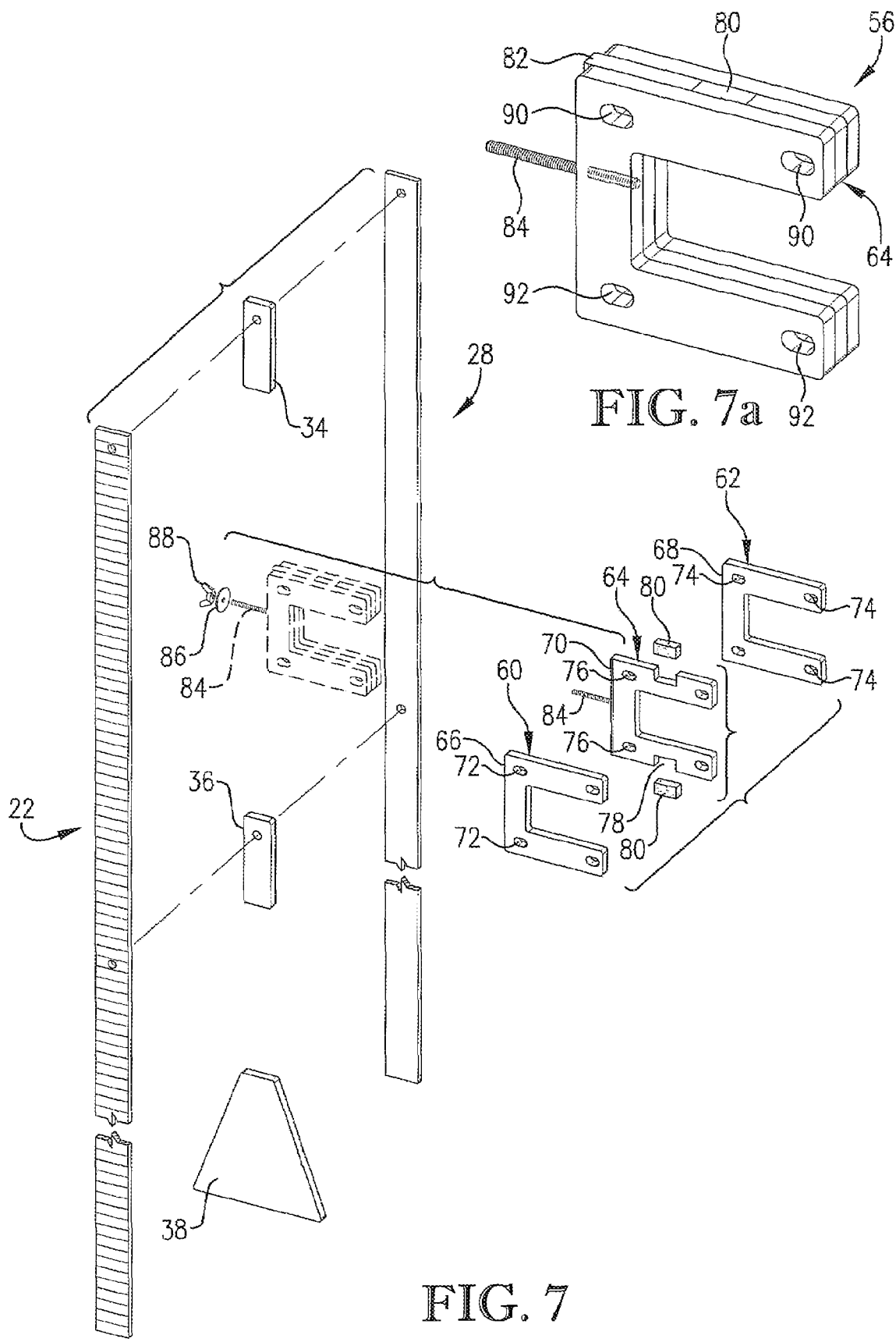
FIG. 7 is a fragmentary, isometric exploded view of the jig assembly depicted in FIGS. 5-6.
FIG. 7a is an enlarged isometric view of the C-shaped clamp forming a part of the jig assembly of FIGS. 5-6.

FIGS. 5-7 depict another positioning jig assembly 54 in accordance with the invention. The assembly 54 includes the identical standard 16 of the first embodiment, but has a modified support 56 designed to hold a metallic electrical utility box 58 commonly used in commercial construction. As shown in FIG. 5, such utility boxes commonly have outwardly projecting attachment screws 58a as well as upper and lower projecting attachment flanges 59.

Figure 8:
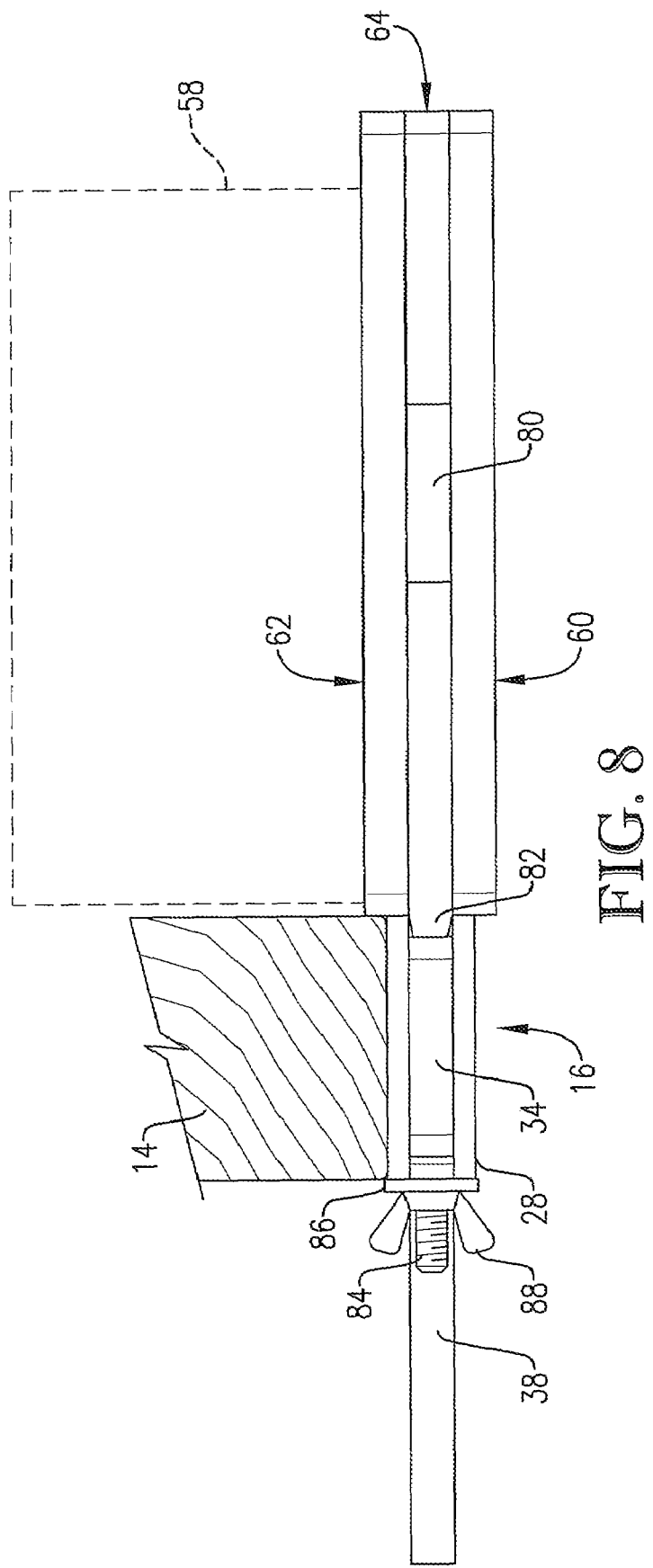
FIG. 8 is a plan view illustrating the use of the jig assembly of FIGS. 5-6 in placement of an electrical utility box.

In particular, the support 56 (FIG. 7) is made up of three interconnected generally C-shaped bodies, namely outer bodies 60, 62 together with an internal body 64. Each of the C-shaped bodies 60-64 is of similar construction and include an upright bight 66, 68, and 70, as well as upper and lower projecting arms 72, 74, and 76. The arms 76 of the central C-shaped body 64 are notched as at 78 and each holds a permanent magnet 80. In addition, the central body 64 has a rearwardly-extending projection 82 which fits within slot 40 of standard 16. An elongated, threaded bolt 84 extends from body 64 and is of a length to pass fully through slot 40. A washer 86 and wing nut 88 are provided to secure the body 56 to standard 16. It will be observed that the three C-shaped bodies 60-64 have pairs of aligned slots 90 and 92 provided in the upper and lower arms thereof. Finally, it will be seen (FIG. 8) that the overall thickness of support 56 is greater than the thickness of standard 16.

The use of assembly 54 is similar to that previously described in connection with assembly 10. In this case, however, the utility box 58 is magnetically coupled to support 56 by virtue of the presence of the upper and lower magnets 80. Specifically, box 58 is first positioned by inserting the screws 58a into the slots 90, 92, thereby magnetically adhering the box 58 to the support 56. The assembly 54 is the placed adjacent structural member 14, with the outer surface of standard panel 22 or 28 in direct, face-to-face contact with the member 14. Again referring to FIG. 4, it will be noted that the metallic box 58 is offset rearwardly from the forward edge surface of the member 14, which is desired for commercial construction. Next, appropriate fasteners are passed through the connection flanges 59 in order to secure box 58 to member 14, whereupon the assembly 54 may be removed, leaving the box 58 in place. Again, this operation may be repeated throughout a given construction to achieve uniform placement of a multitude of utility boxes.

The embodiments described herein are illustrative of the present invention and should not be seen as limiting the scope of the invention in any way.

I claim:

1. An electrical utility box positioning jig assembly, comprising:

an elongated standard presenting a pair of opposed, generally flat, front and rear surfaces, said standard further presenting a pair of vertical side margins;

a base secured to said standard having side margins that extend beyond the vertical side margins of the standard;

a support configured to hold an electrical utility box; and structure operatively coupling said support to said standard and permitting selective up and down movement of the support along the length of the standard and locking of the support at a selected height on the standard, said rear surface of said standard configured for direct, face-to-face contact with a structural member to which the box is to be attached when the box is held by said supports, said standard including spaced apart front and rear panels defining an elongated slot therebetween, the outer face of said front panel defining said front standard surface, and the outer face of said rear panel defining the rear standard surface said base being sandwiched between the lower ends of said front and rear panels.

2. The assembly of claim 1, at least one of said front and rear surfaces having a series of vertically spaced apart height measurement markings thereon.

3. The assembly of claim 1, said base being located between said front and rear surfaces.

4. The assembly of claim 1, said coupling structure extending through said slot.

5. The assembly of claim 1, said support comprising a generally C-shaped body dimensioned to hold said utility box.

6. The assembly of claim 1, both of said front and rear standard surfaces having vertically spaced apart height measurement markings thereon, and both of said front and rear standard surfaces configured for said direct, face-to-face contact with said structural member.

7. The assembly of claim 1, said support having a thickness no greater than the thickness of said standard.

8. The assembly of claim 1, said support having a thickness greater than the thickness of said standard.

9. The assembly of claim 1, said support carrying at least one magnet in order to magnetically hold a metallic utility box.

10. The assembly of claim 1, said standard having an elongated slot extending along the length thereof and between said front and rear surfaces, said support comprising a generally C-shaped body, said coupling structure including an elongated, threaded connector secured to said body and extending through said slot.

11. A method of installing first and second individual electrical utility boxes each to a corresponding structural member at substantially the same height, said method comprising the steps of:
   providing a jig assembly as set forth in claim 1;
   shifting said support to a selected position along the length of said standard, and locking the support at said selected position;
   placing a first electrical utility box on said support;
   locating the rear surface of said standard in direct, face-to-face contact with a first structural member;
   attaching said first electrical utility box to said first structural member;
   removing said jig assembly from said first structural member after said attachment step;
   placing a second electrical utility box on said support;
   locating the rear surface of said standard in direct, face-to-face contact with a second structural member;
   attaching said second electrical utility box to said second structural member; and
   removing said jig assembly from said second structural member.

12. An electrical utility box positioning jig assembly, comprising:
   an elongated standard having a pair of opposed, spaced apart front and rear panels presenting opposed, generally flat front and rear surfaces with an elongated slot between the front and rear panels;
   a support including a generally C-shaped body configured to hold an electrical utility box; and
   coupling structure including an elongated threaded bolt extending through said slot, and a nut secured to said bolt, said coupling structure operable to mount said support to said standard and permitting selective tip and down movement of the support along the length of the standard and locking of the support at a selected height on the standard,
   said front and rear surfaces of said standard each configured for alternate, direct, face-to-face contact with a structural member to which the box is to be attached when the box is held by said support.

13. The assembly of claim 12, said C-shaped body having a thickness no greater than the thickness of said standard.

14. The assembly of claim 12, said C-shaped body having a thickness greater than the thickness of said standard.

15. The assembly of claim 12, said C-shaped body carrying at least one magnet to magnetically hold a metallic utility box.

16. The assembly of claim 12, at least one of said front and rear panel surfaces presenting a series of vertically spaced apart height measurement markings thereon.

17. An electrical utility box positioning jig assembly, comprising:
   an elongated standard presenting a pair of opposed, generally flat, front and rear surfaces, said standard further presenting a pair of vertical side margins, both of said front and rear standard surfaces having vertically spaced apart height measurement markings thereon;
   a base secured to said standard having side margins that extend beyond the vertical side margins of the standard;
   a support configured to hold an electrical utility box; and
   structure operatively coupling said support to said standard and permitting selective up and down movement of the support along the length of the standard and locking of the support at a selected height on the standard,
   both of said front and rear standard surfaces configured for direct, face-to-face contact with a structural member to which the box is to be attached when the box is held by said support.

* * * * *